Aug. 16, 1955  O. NEUENSCHWANDER  2,715,690

SALIENT POLE FOR COMMUTATOR MACHINES

Filed Feb. 28, 1952

Inventor
Otto Neuenschwander
By Singer Stern & Carlberg
attys

United States Patent Office 2,715,690
Patented Aug. 16, 1955

2,715,690

SALIENT POLE FOR COMMUTATOR MACHINES

Otto Neuenschwander, Kilchberg-Zurich, Switzerland

Application February 28, 1952, Serial No. 274,005

2 Claims. (Cl. 310—220)

Various methods have so far been suggested of preventing or suppressing the damaging, so-called "armature reaction" in collector motors and generators. These methods consist basically of slots or perforations in the poles, pole shoes made of special material or auxiliary coils (apart from real compensation coils) with the object of influencing the magnetic condition, but none of them have hitherto been suitable for small motors or dynamos, where treatment of this kind would be of great value. In the case of small motors recourse is had to the well-known method of brush-displacement from the neutral zone (or displacement of the collector joints), whereby despite field-distortion a sparkless movement can be achieved at the cost of reduction in performance of the motor or dynamo.

But it is no less important to correct the "armature reaction" in small motors and generators than in large ones, since this reaction prevents the magnetic field from spreading evenly over the whole pole width, so that the magnetic field is restricted to one pole edge and a few armature teeth, with the result that magnetic reluctance is increased and the effective field reduced accordingly, leading to the drawback described above.

The present invention consists of a stator and pole development for collector motors and generators with defined poles through which the said drawbacks are eliminated and such motors become capable of a greater specific performance and produce a better commutation.

In Figures 1–3, appended hereto, the various features of the invention are sketched on a large scale.

A knowledge of cause and effect of the so-called "armature reaction" is taken for granted in the account which now follows.

Figure 1:
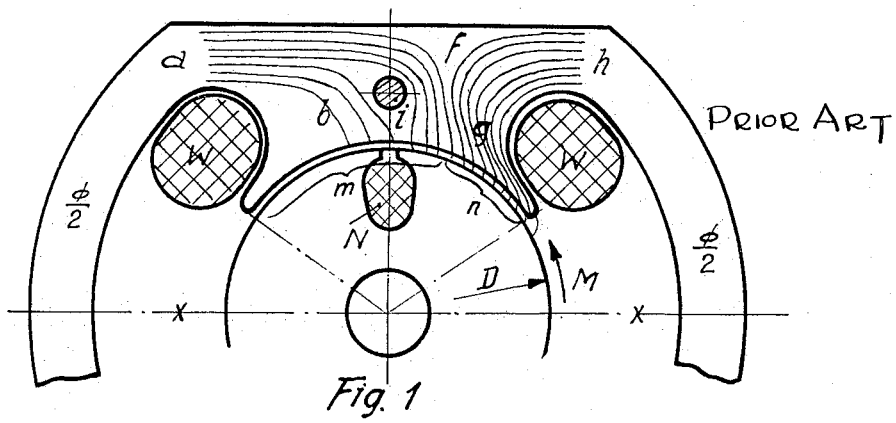
Fig. 1 shows a cross-section through the stator and rotor of a small motor or dynamo of the construction usual hitherto.
Figure 2:
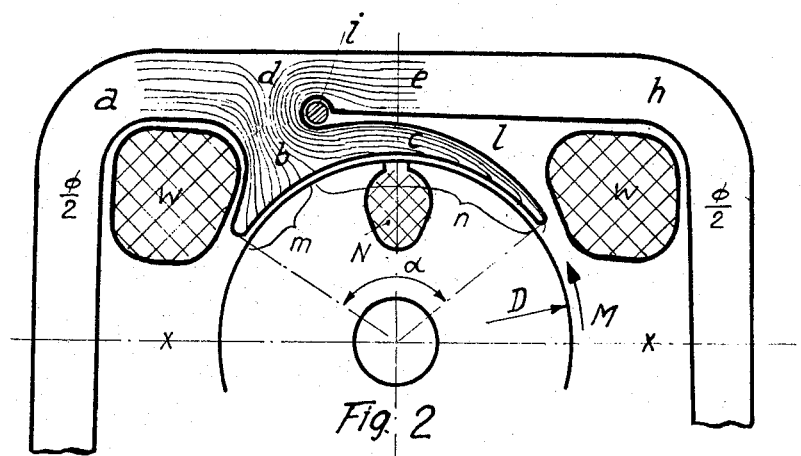
Fig. 2 shows a cross-section through the stator and rotor of a small motor according to the invention, and on the same scale.

In both Fig. 1 and Fig. 2 the stator excitation coil w—w is pushed over the defined poles producing the stator flux, which in the case of currentless armatures would spread from the yokes evenly over the whole surface. But in the case of charged armatures, i. e. those flooded with electric current, the stator field is distorted or displaced by the supplementary armature field, so that the common stator armature field which results is concentrated on the entrance side of the pole shoes in the case of a motor and on their exit side in the case of a generator, as indicated in Fig. 1. In the case of the armature direction of revolution M as motor, the stator flux is displaced from yoke $a$ towards pole zone $f$, thus increasing magnetic saturation in zone $g$ or $n$, whereas the armature teeth in zone $m$ are not flooded, resulting, as is well known, in a great reduction of revolution or tension.

Through a displacement of the brush-axis and thus of the magnetic axis of the armature from neutral zone $x$—$x$, in the case of a motor against, and of a dynamo with the direction of revolution, the influence of the armature reaction on the commutation is corrected, but the field displacement increased. This, however, produces a reduction in the performance of the motor or dynamo, particularly in the case of motors with high revolution. Without here discussing at greater length the details which are common knowledge, it should simply be mentioned that in consequence of their usual curtailed circular shape small collector motors provide unfavourable conditions in regard to armature diameter D and the surface of the stator sheet metal employed, thus giving rise to an unfavourable relation between armature copper N and stator copper W.

Fig. 2 shows the new development of the stator pole of a 2-pole motor which remedies the difficulties described.

In the actual pole neck (between yokes and pole surfaces) perforation $l$, approximately of the shape indicated, is made, whereby the tension relations of the effective magnetic flux are essentially altered, as explained below.

The two partial magnetic fluxes 2 from yokes $a$ unite in zone $d$, which in consequence of perforation 2 forms a slight bottleneck. In Fig. 2 the course of the common magnetic stator armature flux and its local density is indicated by lines of force on the supposition that the armature is flooded with current, i. e. charged. It is at once clear that, if the pole tongue is of suitable dimensions, the flux is prevented from being forced against a pole edge on one side and, by the magnetic reluctances or saturation conditions in the thin pole tongue, is forced to spread evenly over pole zones $b$ and $c$ and from there to cross over to armature zones $m$ and $n$. Thus in the simplest possible way the effective flux is forced to pass over to all the armature teeth under the pole surface, whereby the effectiveness of the system is of course increased.

Even field distribution under the poles is in many respects desirable and brings great advantages which have long been known and need no further explanation here.

The shape of perforation $l$ or the development of pole tongue $c$ need not necessarily correspond with that indicated, for it can be adapted to particular circumstances according to the purpose for which the motor or dynamo has been constructed. It is of great advantage for it to be combined with the perforation for the packet rivet, as shown in Fig. 2. The only point of importance is that perforation in the pole neck should be made in a peripheral direction and of dimensions corresponding with the saturation conditions, thus forcing the flux to take the desired course, provided that the stator ampere windings are chosen large enough. The particular advantage gained through the arrangement described is that it makes it possible with any given length of armature to drive much greater fluxes through the armature, this requiring of course larger ampere winding figures of M. M. F. on the stator than hitherto. For this reason the usual shape of stator sheet metal has been abandoned and, instead of the normal curtailed circle as in Fig. 1, the rectangular shape chosen as in Fig. 2. With the same external dimensions and the same expenditure of sheet metal this shape, despite greater armature diameter D, allows more space for the accommodation of stator winding W, thus enabling a more favourable relation between stator and armature copper to be chosen.

This relation is no less important with small motors than with the large ones, since on it depends the active length of a motor for any performance required, this again affecting production costs.

Figure 3:
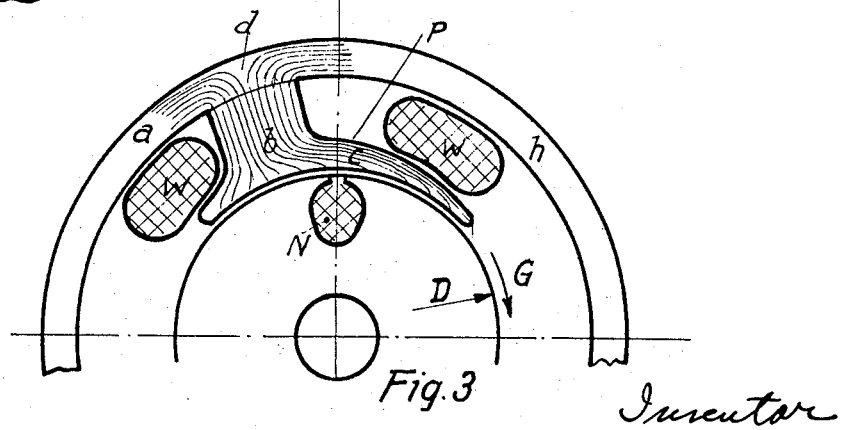
Fig. 3 shows a cross-section through stator pole shoe and rotor of a motor or generator as employed in car construction according to the invention.

What has been said above applies, mutatis mutandis, to smaller dynamos and motors too, as used mainly for car lighting and starting. Fig. 3 shows a normal car lighting dynamo (similar to a starter). Perforation *l* cannot here be made according to the usual stamp-process as with small motors, but, as shown in Fig. 3, by corresponding formation of the solid pole shoes, although as concerns functioning everything remains as already described. The pole shoes are here fastened by screws, which have been omitted from the drawing.

By means of the alteration which has been described and is sketched in Fig. 3 it is easily to be understood that the stator copper of the small dynamo can be reduced, although the effective magnetic flux is at the same time increased, this being equivalent to an increase of electrical performance in the case of dynamos or of mechanical power in the case of starters.

What I claim is:

1. In small unidirectional commutator machines having a stator comprising yokes, an armature rotatably mounted in said stator for cooperation with brushes, salient poles projecting from the inside of said stator yoke, and a stator winding surrounding each of said poles, each of said poles comprising a pole shoe with an armature facing surface having a contour closely conforming to the circumference of said armature, and a pole neck connecting said pole shoe to said stator yoke at one side of the center line of said pole shoe so as to provide a free space between said yoke and said pole shoe extending from one edge of the pole shoe to the opposite side of said center line of the pole shoe whereby to facilitate the mounting of said stator winding, the radial thickness of said pole shoe at the center line being less than the thickness of said yoke and the configuration of said pole shoe and thickness of said pole neck being such as to increase the magnetic reluctance therein in a peripheral direction and to effect a substantially even distribution of the magnetic flux over the entire area of the pole shoe facing the armature so as to substantially suppress the "armature reaction" while enabling the brushes to remain in the magnetically neutral zone at all charges.

2. A commutator machine as set forth in claim 1, in which the stator is substantially rectangular in cross-section.

References Cited in the file of this patent

UNITED STATES PATENTS

| | | |
|---|---|---|
| 873,714 | Burnham | Dec. 17, 1907 |
| 931,556 | Balcome et al. | Aug. 17, 1909 |
| 2,240,652 | Jenkins | May 6, 1941 |
| 2,298,388 | Knobel | Oct. 13, 1942 |